(12) United States Patent
Sun et al.

(10) Patent No.: US 8,238,694 B2
(45) Date of Patent: Aug. 7, 2012

(54) ALIGNMENT OF SHARP AND BLURRED IMAGES BASED ON BLUR KERNEL SPARSENESS

(75) Inventors: Jian Sun, Beijing (CN); Heung-Yeung Shum, Beijing (CN)

(73) Assignee: Microsoft Corporation, Redmond, WA (US)

( * ) Notice: Subject to any disclaimer, the term of this patent is extended or adjusted under 35 U.S.C. 154(b) by 953 days.

(21) Appl. No.: 12/245,339

(22) Filed: Oct. 3, 2008

(65) Prior Publication Data

US 2010/0086232 A1  Apr. 8, 2010

(51) Int. Cl.
*G06K 9/32* (2006.01)
*G06K 9/40* (2006.01)

(52) U.S. Cl. .................. 382/294; 382/255; 382/275

(58) Field of Classification Search .......... 382/254–255, 382/237
See application file for complete search history.

(56) References Cited

U.S. PATENT DOCUMENTS

| | | | |
|---|---|---|---|
| 6,075,905 A | 6/2000 | Herman et al. | |
| 6,097,854 A * | 8/2000 | Szeliski et al. | 382/284 |
| 2001/0021224 A1* | 9/2001 | Larkin et al. | 375/240.16 |
| 2005/0089213 A1 | 4/2005 | Geng | |
| 2006/0087703 A1* | 4/2006 | Chen et al. | 358/463 |
| 2006/0153472 A1* | 7/2006 | Sakata et al. | 382/255 |
| 2006/0187308 A1* | 8/2006 | Lim et al. | 348/208.4 |
| 2007/0086675 A1 | 4/2007 | Chinen et al. | |
| 2007/0165961 A1 | 7/2007 | Lu | |
| 2007/0189748 A1 | 8/2007 | Drimbarean et al. | |
| 2007/0217713 A1* | 9/2007 | Milanfar et al. | 382/299 |
| 2008/0025627 A1 | 1/2008 | Freeman et al. | |

OTHER PUBLICATIONS

Yuan et al., "Image Deblurring with Blurred/Noisy Image Pairs", ACM Transactions on Graphics, vol. 26, No. 3, Article 1, Jul. 2007, 10 pages.*
Mei, et al., "Modeling and Generating Complex Motion Blur for Real-Time Tracking", IEEE Conference on Computer Vision and Pattern Recognition, CVPR 2008, Date: Jun. 23-28, 2008, pp. 1-8.
Shum, et al., "Construction and Refinement of Panoramic Mosaics with Global and Local Alignment", Proceedings of the Sixth International Conference on Computer Vision, Year of Publication: 1998, 6 Pages.
Lensch, et al., "Automated Texture Registration and Stitching for Real World Models", PG, Proceedings of the 8th Pacific Conference on Computer Graphics and Applications table, Year of Publication: 2000, 13 Pages.

(Continued)

*Primary Examiner* — Vu Le
*Assistant Examiner* — Kenny Cese
(74) *Attorney, Agent, or Firm* — Alleman Hall McCoy Russell & Tuttle LLP (57) ABSTRACT

The alignment of a sharp image of a subject and a blurred image of the same subject is disclosed. For example, one disclosed embodiment provides a method of determining a series of trial images. The method comprises applying a corresponding series of coordinate transforms to the sharp image, the series of coordinate transforms differing with respect to one or more of a rotational operation and a scaling operation. The method further comprises computing a series blur kernels corresponding to the series of trial images, each blur kernel mapping a trial image from the series of trial images to the blurred image. The method further includes locating a sparsest blur kernel in the series of blur kernels, and identifying one or more of the rotational operation and the scaling operation of the coordinate transform mapping the trial image corresponding to the sparsest blur kernel to the blurred image.

20 Claims, 7 Drawing Sheets

OTHER PUBLICATIONS

Ojansivu, et al., "Image Registration Using Blur-Invariant Phase Correlation", IEEE Signal Processing Letters, vol. 14, No. 7, Jul. 2007, pp. 449-452.

Zomet, et al., "Applying Super-Resolution to Panoramic Mosaics", Proceedings of the 4th IEEE Workshop on Applications of Computer Vision (WACV'98), Year of Publication: 1998, pp. 286-287.

Bascle, et al., "Motion Deblurring and Super-Resolution from an Image Sequence", Lecture Notes in Computer Science; vol. 1065, Proceedings of the 4th European Conference on Computer Vision—vol. II-vol. II, Year of Publication: 1996, pp. 573-582.

Brown, et al., "Recognizing Panoramas", 10th International Conference on Computer Vision, ICCV 2003, Date: Oct. 13-16, 2003, 8 Pages.

Fergus, et al., "Removing Camera Shake from a Single Photograph", ACM Transactions on Graphics (TOG), vol. 25, Issue 3 (Jul. 2006), Proceedings of ACM SIGGRAPH 2006, Session: Matting & deblurring, Year of Publication: 2006, pp. 787-794.

Flusser, et al., "Moment Forms Invariant to Rotation and Blur in Arbitrary Number of Dimensions", IEEE Transactions on Pattern Analysis and Machine Intelligence, vol. 25, Issue 2, Date: Feb. 2003 pp. 234-246.

Flusser, et al., "Degraded Image Analysis: An Invariant Approach", IEEE Transactions on Pattern Analysis and Machine Intelligence, vol. 20, Issue 6, Date: Jun. 1998, pp. 1-14.

Jia, et al., "Bayesian Correction of Image Intensity with Spatial Consideration", European Conference on Computer Vision, 2004, LNCS 3023, Date: 2004, pp. 342-354.

Jin, et al., "Visual Tacking in Presence of Motion Blur", IEEE Computer Society Conference on Computer Vision and Pattern Recognition, 2005. CVPR 2005, Publication Date: Jun. 20-25, 2005, vol. 2, pp. 18-25.

Levin, Anat, "Blind Motion Deblurring Using Image Statistics", In Advances in Neural Information Processing Systems (NIPS 2006), Date: 2006, 8 Pages.

Levin, et al., "User Assisted Separation of Reflections from a Single Image Using a Sparsity Prior", IEEE Transactions on Pattern Analysis and Machine Intelligence, vol. 29, Issue 9, Date: Sep. 2007 pp. 1647-1655.

Levin, et al., "Learning How to Inpaint from Global Image Statistics", Proceedings of the Ninth IEEE International Conference on Computer Vision (ICCV'03), Publication Date: Oct. 13-16, 2003, on pp. 305-312 vol. 1.

Lowe, David G., "Distinctive Image Features from Scale-Invariant Keypoints", Accepted for publication in the International Journal of Computer Vision, 2004, Date: Jan. 5, 2004, pp. 1-28.

Lucas, et al., "An Iterative Image Registration Technique with an Application in Stereo Vision", Proceedings of Imaging Understanding Workshop, Date: 1981, pp. 121-129.

Lucy, L. B., "An Iterative Technique for the Rectification of Observed Distributions", The Astronomical Journal, vol. 79, No. 6, Date: Jun. 1974, pp. 745-754.

Raskar, et al., "Coded Exposure Photography: Motion Deblurring Using Fluttered Shutter", ACM Transactions on Graphics (TOG), vol. 25, Issue 3 (Jul. 2006), Proceedings of ACM SIGGRAPH 2006, Year of Publication: 2006 Session: Matting & deblurring table of contents, pp. 795-804.

Rav-Acha, et al., "Restoration of Multiple Images with Motion Blur in Different Directions", Fifth IEEE Workshop on Applications of Computer Vision, 2000, Date: 2000, pp. 22-27.

Rav-Acha, et al., "Two Motion-Blurred Images are better than one", Pattern Recognition Letters, vol. 26, Issue 3 Date: Feb. 2005, Year of Publication: 2005, pp. 311-317.

Roth, et al., "Fields of Experts: A Framework for Learning Image Priors", IEEE Computer Society Conference on Computer Vision and Pattern Recognition, 2005. CVPR 2005, Publication Date: Jun. 20-25, 2005, vol. 2, on pp. 860-867 vol. 2.

Szeliski, Richard, "Image Alignment and Stitching: A Tutorial", Technical Report MSR-TR-2004-92, Last updated, Dec. 10, 2006, 89 Pages.

Tappen, et al., "Exploiting the Sparse Derivative Prior for Super-Resolution and Image Demosaicing", In Third International Workshop on Statistical and Computational Theories of Vision at ICCV 2003, Date: 2003, pp. 1-28.

Yuan, et al., "Image Deblurring with Blurred/Noisy Image Pairs", ACM Transactions on Graphics, vol. 26, No. 3, Article 1, Publication date: Jul. 2007, 10 Pages.

* cited by examiner

ALIGNMENT OF SHARP AND BLURRED IMAGES BASED ON BLUR KERNEL SPARSENESS

BACKGROUND

Image-alignment procedures are used in various image- and video processing applications, which include image stabilization, image enhancement, video summarization, panorama and satellite photo stitching, and medical imaging, as examples. Some currently used image-alignment procedures are based on feature recognition: like features in a pair of misaligned images are located, then placed into registry by subjecting one of the images to a coordinate transformation. However, alignment methods based on feature-recognition may be unreliable when one or both of the images is affected by motion blur.

SUMMARY

Accordingly, various embodiments are disclosed herein that relate to the alignment of two images, where one of the images is affected by motion blur. Thus, in one embodiment, a method to align a sharp image of a subject and a blurred image of the same subject is provided. The method comprises computing a series of trial images by applying a corresponding series of coordinate transforms to the sharp image, the series of coordinate transforms differing with respect to one or more of a rotational operation and a scaling operation. The method further comprises computing a series blur kernels corresponding to the series of trial images, each blur kernel mapping a trial image from the series of trial images to the blurred image. The method further comprises locating a sparsest blur kernel in the series of blur kernels, and identifying one or more of the rotational operation and the scaling operation of the coordinate transform mapping the trial image corresponding to the sparsest blur kernel to the blurred image.

It will be understood that the Summary above is provided to introduce in simplified form a selection of concepts that are further described in the Detailed Description. It is not meant to identify key or essential features of the claimed subject matter, the scope of which is defined by the claims that follow the Detailed Description. Further, the claimed subject matter is not limited to implementations that solve any disadvantages noted above or in any part of this disclosure.

DETAILED DESCRIPTION

Figure 1:
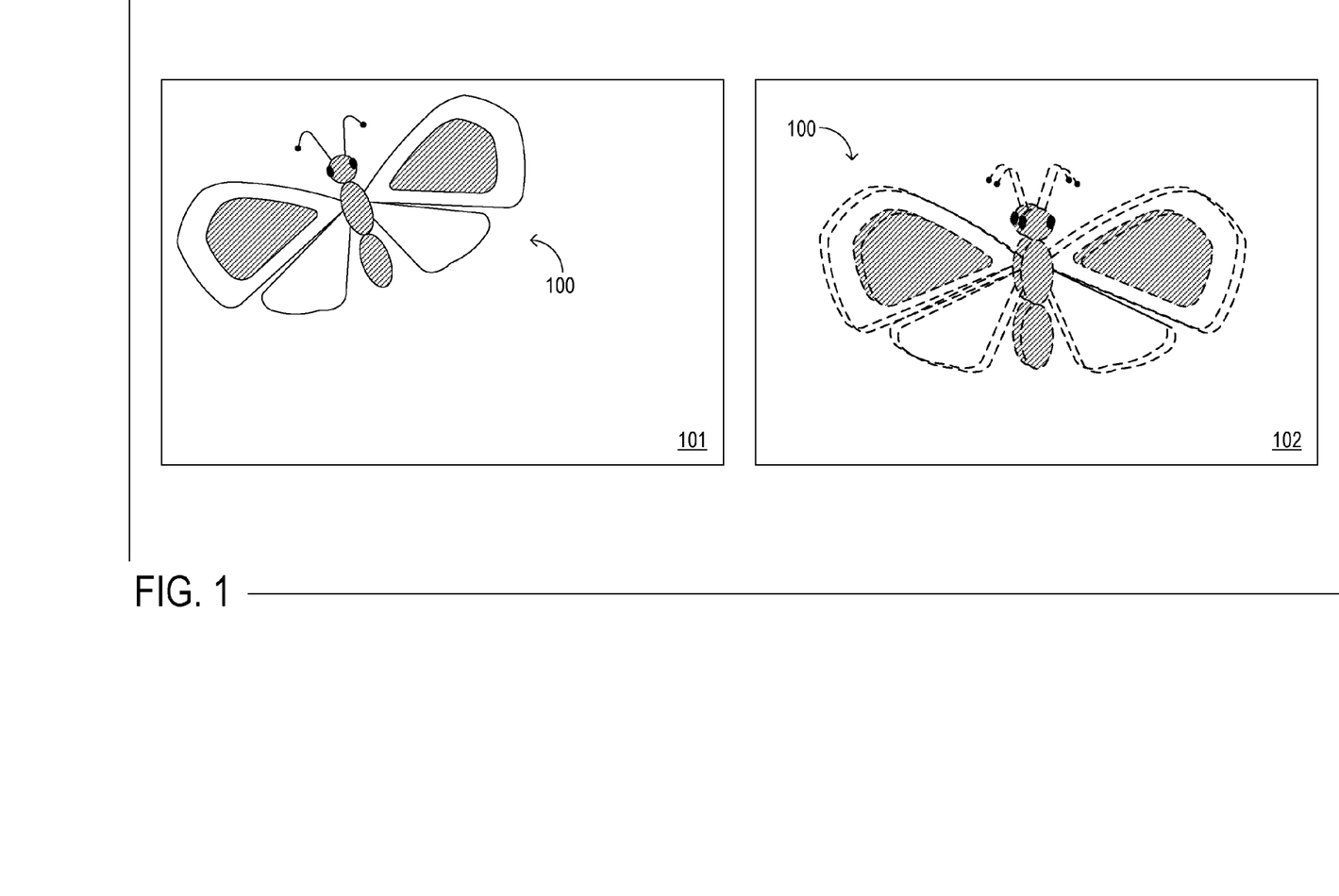
FIG. 1 represents two images of an example subject, in accordance with the present disclosure.

In FIG. 1, two images of an example subject 100 are represented: first image 101 and second image 102. Subject 100 may be an any, arbitrarily chosen subject; it may be an intended subject of a photograph or video capture, for example. In some embodiments, subject 100 may be part of a larger photographic or video subject.

Accordingly, first image 101 and second image 102 may be photographic or video images. These images may have been acquired digitally, via a digital camera, for example, or otherwise acquired on photographic film, analog videotape, etc., and digitized via subsequent processing. In any case, first image 101 and second image 102 may each comprise a matrix of pixels, each pixel comprising color and/or brightness information.

It will be observed that the subject of first image 101 is misaligned (i.e., out of registry) with the subject of second image 102. In the illustrated example, misalignment is due to a translation of the subject, a rotation of the subject, and a scaling difference between the two images. It will further be observed that the subject in the first image and the subject in the second image may placed into registry by changing the alignment of the first image with respect to the second image. Such whole-image alignment may comprise translating the first image with respect to the second image, rotating the first image with respect to the second image, and/or modifying a scale of the first image or the second image.

In FIG. 1, the subjects of the two images differ with respect to sharpness as well as alignment. Thus, subject 100 is sharp in first image 101, but blurred in second image 102. It will be understood that the blurring of subject 100 is rendered in a stylized manner; viz., the doubled, dashed borders in second image 102 are intended to represent blurring. Likewise, the clean borders in first image 101 are intended to represent sharpness.

A subject in an image may be blurred as a result of motion blur. Motion blur may occur when the subject and a device that acquires the image (a camera, a video recorder, etc.) are in motion relative to each other while the image is being acquired. Such relative motion may comprise a motion of the subject, a motion of the image-acquiring device, or both.

The effect of motion blur on an image of a subject may be described mathematically. In one approach, a blur kernel k maps a sharp image I to a blurred image B, $$B = I \hat{\times} k, \quad (1)$$

where $\hat{\times}$ is the convolution operator. It has been demonstrated that the blur kernel mapping the sharp image to the blurred image can be estimated accurately when both the sharp image and the blurred image are known independently [L. Yuan, J. Sun, L. Quan, and H.-Y. Shum. ACM Trans. Graph. (SIGGRAPH), 26(3):1-10, 2007]. In particular, the blur kernel can be estimated by assigning the elements $\hat{k}_i$ in kernel $\hat{k}$ to minimize the quantity $$\|B - I \hat{\times} \tilde{k}\|^2 + \lambda \|\tilde{k}\|^2, \quad (2)$$

subject to the constraints $$\tilde{k}_i \geq 0, \sum_i \tilde{k}_i = 1, \text{ and } \lambda = 3. \quad (3)$$

The kernel $\tilde{k}$ that minimizes eq 2 according to the constraints of eq 3 is then selected as an estimate of blur kernel k.

The elements of some blur kernels occurring in photographic and video applications may follow a predictable distribution function $p(k_i)$, as follows:

$$p(k_i) \propto w_1 e^{-ki/\beta_1} + (1-w_1)e^{-k1/\beta_2}, \quad (4)$$

where $k_i$ is the ith element in blur kernel k, and $w_1$, $\beta_1$, and $\beta_2$ are parameters. Best-fit parameter values obtained for a series of sharp and blurred image pairs, e.g., $$w_1 = 0.6, \beta_1 = 0.01, \beta_2 = 0.03, \quad (5)$$

show that blur kernels occurring in some photographic and video applications may be sparse in a mathematical sense.

The relationships outlined above relate sharp and blurred images that are in perfect registry with each other, but sharp and blurred images that are not in registry may be aligned according to a method that relies on blur-kernel sparseness. For example, assuming that a blur kernel linking sharp and blurred images will be maximally sparse only when the images are in proper alignment, it may be possible to align the images by iteratively adjusting one or more alignment parameters so as to maximize the blur-kernel sparseness.

To enact such a method, a metric for blur-kernel sparseness may be employed. Assuming that the probabilistic distribution of blur kernel k is given by $$P(k) = \prod_i p(k_i), \quad (6)$$

a sparseness $E(k)$ of the blur kernel may be computed according to $$E(k) = -\frac{1}{Z} \sum_i \ln p(k_i), \quad (7)$$

where Z is the kernel size. Another measure of blur-kernel sparseness is the entropy, computed according to $$S(k) = -\int_x p(x) \ln p(x). \quad (8)$$

In a simple, proof-of-concept experiment, a sharp and blurred image pair were acquired, and a series of misaligned images were generated by scaling the acquired sharp image by various scaling factors and rotating it through various angles. Next, a series of blur kernels mapping the acquired and misaligned images to the blurred image were computed according to the procedure set forth in eqs 2-3. Finally, they computed $E(k)$ for each blur kernel in the series according to eqs 6-7. The inventors found that the value of $E(k)$ computed in this manner is greatest for the unscaled, unrotated (i.e., properly aligned) sharp image.

As noted hereinabove, misalignment in an image pair may include a translational offset between the two images, in addition to rotational and scaling differences. However, when a sharp image and a blurred image are translated relative to each other, the translation is reflected linearly in the blur kernel relating them; as sparseness is an isotropic property, the sparseness of the blur kernel relating the image pair is insensitive, therefore, to the state of translational alignment of the images.

One consequence of the above analysis is that methods to correct rotational and scaling misalignment based on blur-kernel sparseness may continue to work even if the images are translationally misaligned. Another consequence is that a different method must be used to align the images translationally, if translational misalignment is present. The latter issue is further considered hereinafter, in the context of an overall image-alignment method.

Figure 2:
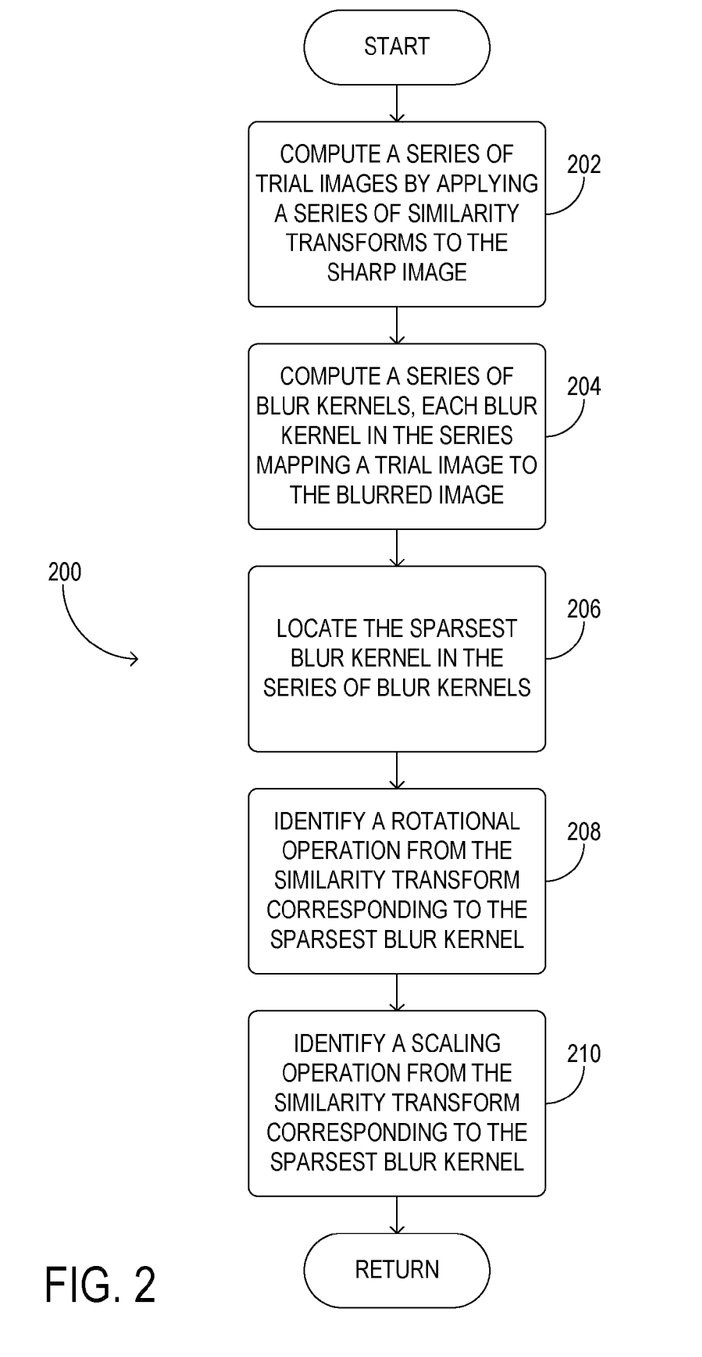
FIG. 2 illustrates a method to align a sharp image of a subject and a blurred image of the same subject, in accordance with an embodiment of the present disclosure.

FIG. 2 illustrates an example method 200 to align a sharp image of a subject and a blurred image of the same subject. The method begins at 202, where a series of trial images is computed by applying a corresponding series of coordinate transforms to the sharp image, the series of coordinate transforms differing with respect to one or more of a rotational operation and a scaling operation.

In one embodiment, the series of coordinate transforms may span a two-dimensional parameter space, the two-dimensional parameter space including a rotational parameter and a scaling parameter. This embodiment is relevant when misalignment between sharp and blurred images is modeled as a similarity transform. Neglecting the translational part of the similarity transform discussed above, each coordinate transform in the series of coordinate transforms may be of the form $$\begin{pmatrix} x' \\ y' \end{pmatrix} = s \begin{bmatrix} \cos\theta & -\sin\theta \\ \sin\theta & \cos\theta \end{bmatrix} \begin{pmatrix} x \\ y \end{pmatrix}, \quad (9)$$

where s is a scaling parameter and $\theta$ is a rotational parameter. A coordinate transform of this form may be applied to every pixel (x, y) in the sharp image to generate a corresponding trial image. Further, the series of coordinate transforms may be constructed by varying the scaling parameter s and/or the rotational parameter $\theta$ within the series. In particular, these parameters may be varied within predetermined ranges, e.g., $$s_{min} \leq s \leq s_{max}, \theta_{min} \leq \theta \leq \theta_{max}. \quad (10)$$

In another embodiment, the series of coordinate transforms may span a four-dimensional parameter space, the four-dimensional parameter space including two rotational parameters and two scaling parameters. This embodiment is relevant when misalignment between sharp and blurred images is modeled as an affine transformation. Neglecting the translational part of the affine transformation discussed above, each coordinate transform in the series of coordinate transforms may be of the form $$\begin{pmatrix} x' \\ y' \end{pmatrix} = A \begin{pmatrix} x \\ y \end{pmatrix}, \quad (11)$$

where transformation matrix A involves two rotations and an anisotropic scaling. Based on singular-value decomposition, transformation matrix A may be decomposed as $$A = R(\theta)R(-\phi)DR(\phi), \quad (12)$$

where $R(\theta)$ and $R(\phi)$ are rotations by $\theta$ and $\phi$, respectively, and D is the diagonal matrix diag($s_1$, $s_2$). Thus, four parameters—$s_1$, $s_2$, $\theta$, and $\phi$—may be varied within predetermined ranges to construct the series of coordinate transforms. Following the previous embodiment, coordinate transforms in the form of eq 11 may be applied to every pixel (x, y) in the sharp image to generate the series of trial images.

Method 200 continues to 204, where a series blur kernels is computed, the series of blur kernels corresponding to the series of trial images, with each blur kernel mapping a trial image from the series of trial images to the blurred image. In one embodiment, the series of blur kernels may be computed according to the method set forth in eqs 2-3.

Method 200 continues to 206, where the sparsest blur kernel in the series of blur kernels is located. In one embodiment, locating the sparsest blur kernel in the series of blur kernels comprises evaluating a blur-kernel sparseness E(k) according to eq 7. In another embodiment, locating the sparsest blur kernel in the series of blur kernels comprises evaluating an entropy S(k) of a blur-kernel distribution function according to eq 8.

Method 200 continues to 208, where a rotational operation of the coordinate transform mapping the trial image corresponding to the sparsest blur kernel to the blurred image is identified, and to 210, where a scaling operation of the coordinate transform mapping the trial image corresponding to the sparsest blur kernel to the blurred image is identified. In one embodiment, steps 208-210 may comprise identifying the scaling and/or rotational parameters s and θ from the coordinate transform corresponding to the sparsest blur kernel as optimal rotational and/or scaling parameters $s_{opt}$ and $\theta_{opt}$.

In some embodiments, image-alignment based on method 200 may further comprise applying one or more of the rotational operation and the scaling operation to the sharp image—in one example, replacing the sharp image by the trial image scaled by $s_{opt}$ and rotated by $\theta_{opt}$. Likewise, one or more of the rotational operation and the scaling operation may be applied to the blurred image, but in reverse.

In method 200, the sharp image is selected as an operand image, and the blurred image is selected as a target image. The operand image is the image to which the series of coordinate transforms are applied to yield a corresponding series of trial images; the target image is the image to which the series of trial images are related via the corresponding series of blur kernels. It will be understood, however, that the converse of this approach is also contemplated. Thus, the blurred image may be selected as the operand image, and the sharp image may be selected as the target image. In the latter embodiment, the series of blur kernels relates the series of trial images to the sharp image.

Figure 3:
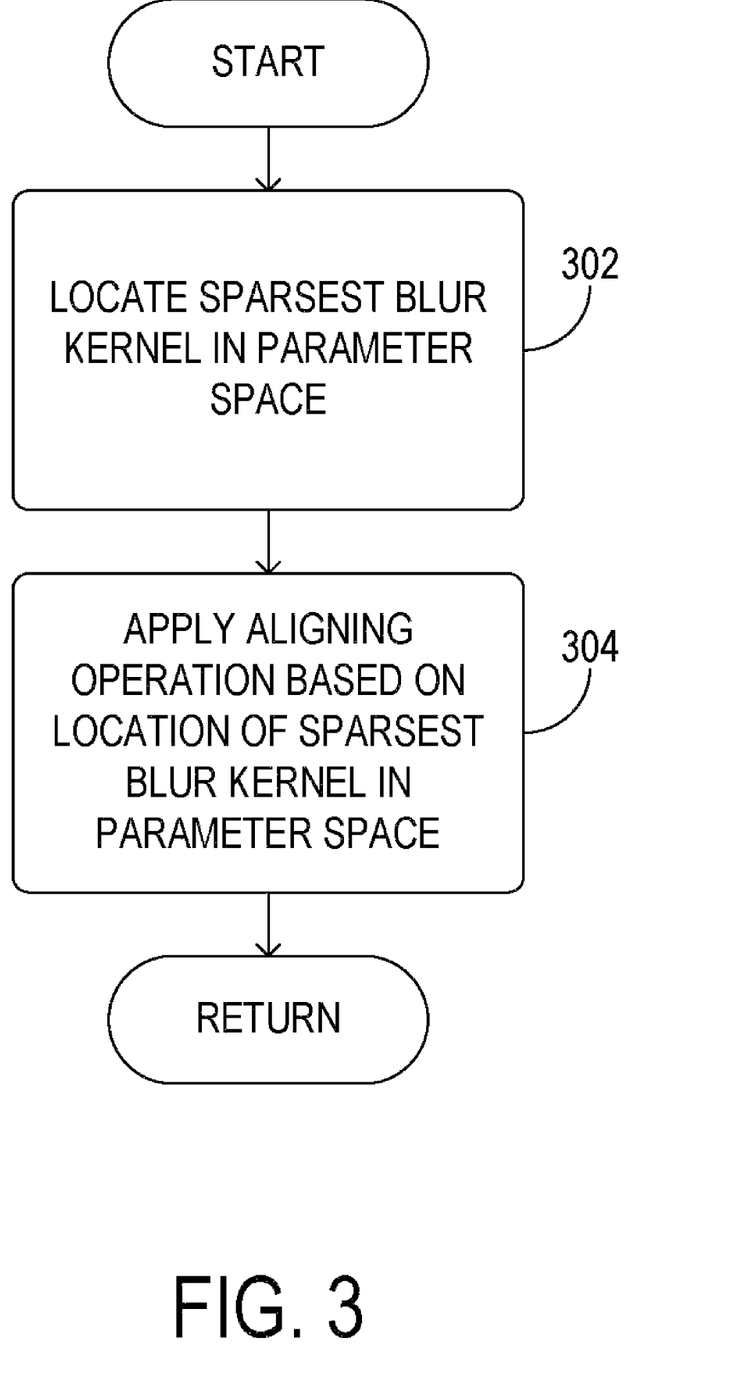
FIG. 3 illustrates a method to align two images of a subject, in accordance with an embodiment of the present disclosure.

Additional methods disclosed herein include aspects of the above approaches and provide additional features as well. One such example is shown in FIG. 3, where a method 300 to align a first and second image of a subject is illustrated. The method includes, at 302, locating a sparsest blur kernel in a parameter space, the sparsest blur kernel relating a select sharp image to a select blurred image, each of the select sharp image and the select blurred image chosen from the first and second images or computationally derived from the first image or the second image.

The term 'locating a sparsest blur kernel in a parameter space' presupposes a dependency of the blur kernel on one or more parameters. In some embodiments, the blur kernel may depend on coordinate-transform parameters s and θ, because the series of coordinate transforms maps the first or second image to a corresponding series of trial images. The parameter dependency is carried through to the computed blur kernels, which relate the series of trial images to the second or first image.

Method 300 continues to 304, where an aligning operation is applied to one or more of the first image and the second image, where the aligning operation is based on a location of the sparsest blur kernel in the parameter space.

In one series of embodiments based on method 300, image-alignment may further comprise applying a series of coordinate transforms (e.g., equation 9) to the first image to yield a corresponding series of trial images; computing a corresponding series of blur kernels relating the series of trial images to the second image, wherein the series of blur kernels includes the sparsest blur kernel; and identifying within the series of coordinate transforms a select coordinate transform corresponding to the sparsest blur kernel. As in method 200, the aligning operation referred to above may include a rotational operation and/or a scaling operation, and may be based at least partly on the select coordinate transform.

In one embodiment, the second image may be the select blurred image; applying the select coordinate transform to the first image would then result in the select sharp image. In this embodiment, the series of trial images includes the select sharp image. In another embodiment, the second image may be the select sharp image; applying the select coordinate transform to the first image would then result in the select blurred image. In this embodiment, the series of trial images includes the select blurred image.

In the embodiments described above, computationally deriving the select sharp image and/or the select blurred image from the first image or the second image comprises applying the select coordinate transform to the first image or to the second image. However, it may further comprise, in these and other embodiments, a downsampling procedure. Thus, one or more of the first image and the second image may be a fine image, and one or more of the select sharp image and the select blurred image may be computationally derived from the fine image by downsampling.

Figure 4:
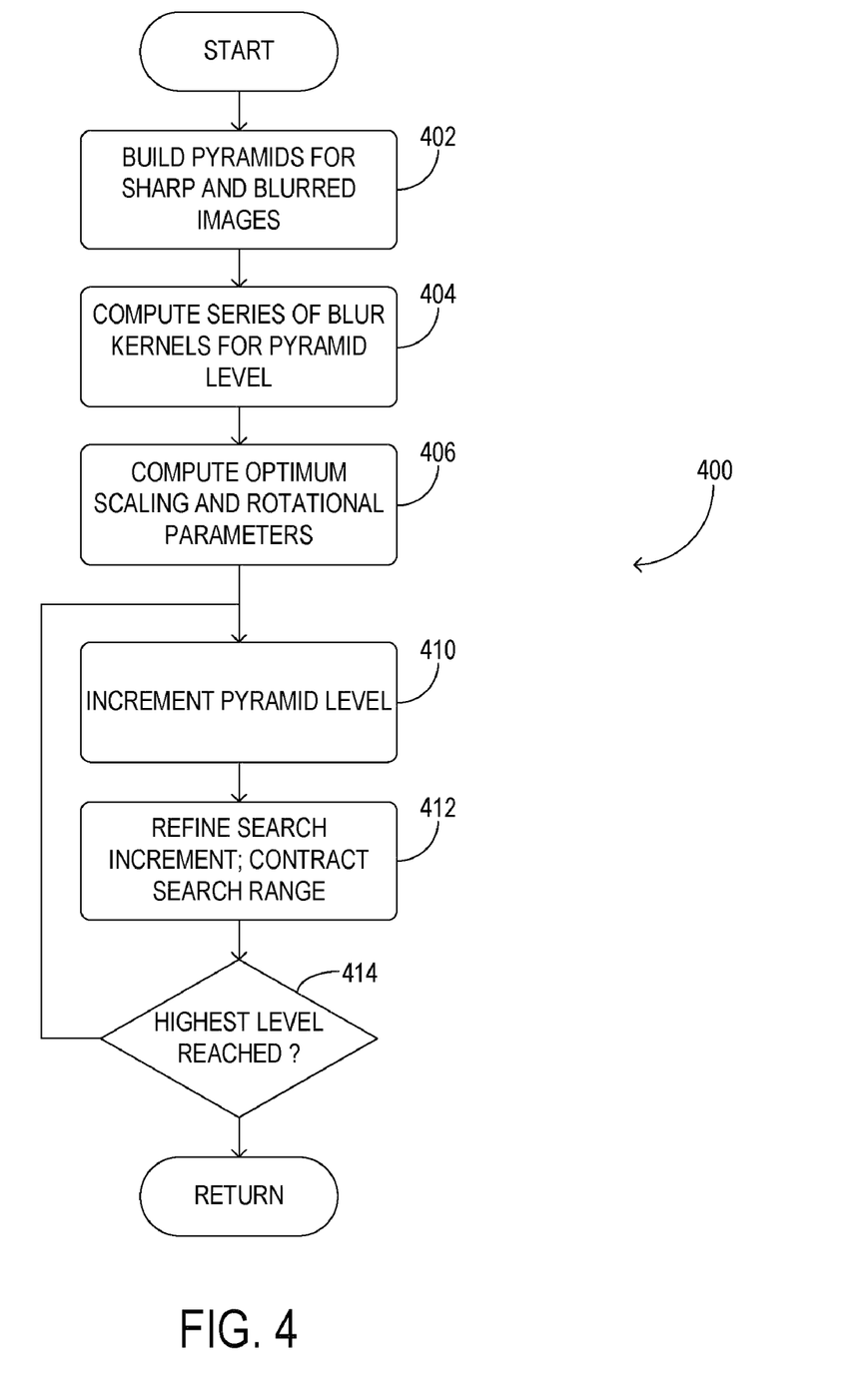
FIG. 4 illustrates aspects of a coarse-to-fine image alignment method, in accordance with an embodiment of the present disclosure.

FIG. 4 illustrates method 400, which includes aspects of a coarse-to-fine, image alignment procedure in one, non-limiting embodiment. The illustrated method employs scale-space representations for both image space and parameter space. At 402, two pyramids, $$\{B^l\}_{l=1}^L \text{ and } \{I^l\}_{l=1}^L \tag{13}$$

are constructed based on full-resolution images B and I, respectively. In the expressions above, integer L represents the height of the pyramid. At 404, a family of blur kernels is computed based on $B^l$ and $I^l$ using an initial search range (viz., eq 10) and initial search increments Δs and Δθ. At 406, optimal scaling and rotational parameters $s_{opt}$ and $\theta_{opt}$ are computed over the current range and pyramid level, according to one of the methods described hereinabove. Then, at 408, the pyramid level is incremented. At 412, the search increments are set to ½ Δs and ½ Δθ, and the search ranges are set to $$s_{opt}-2\Delta s \leq s \leq s_{opt}+2\Delta s, \theta_{opt}-2\Delta\theta \leq \theta \leq \theta_{opt}+2\Delta\theta. \tag{14}$$

At 414, it is determined whether the highest level of the pyramid has been reached. If the highest level of the pyramid has been reached, then the method returns; otherwise, execution resumes at 406.

Figure 5:
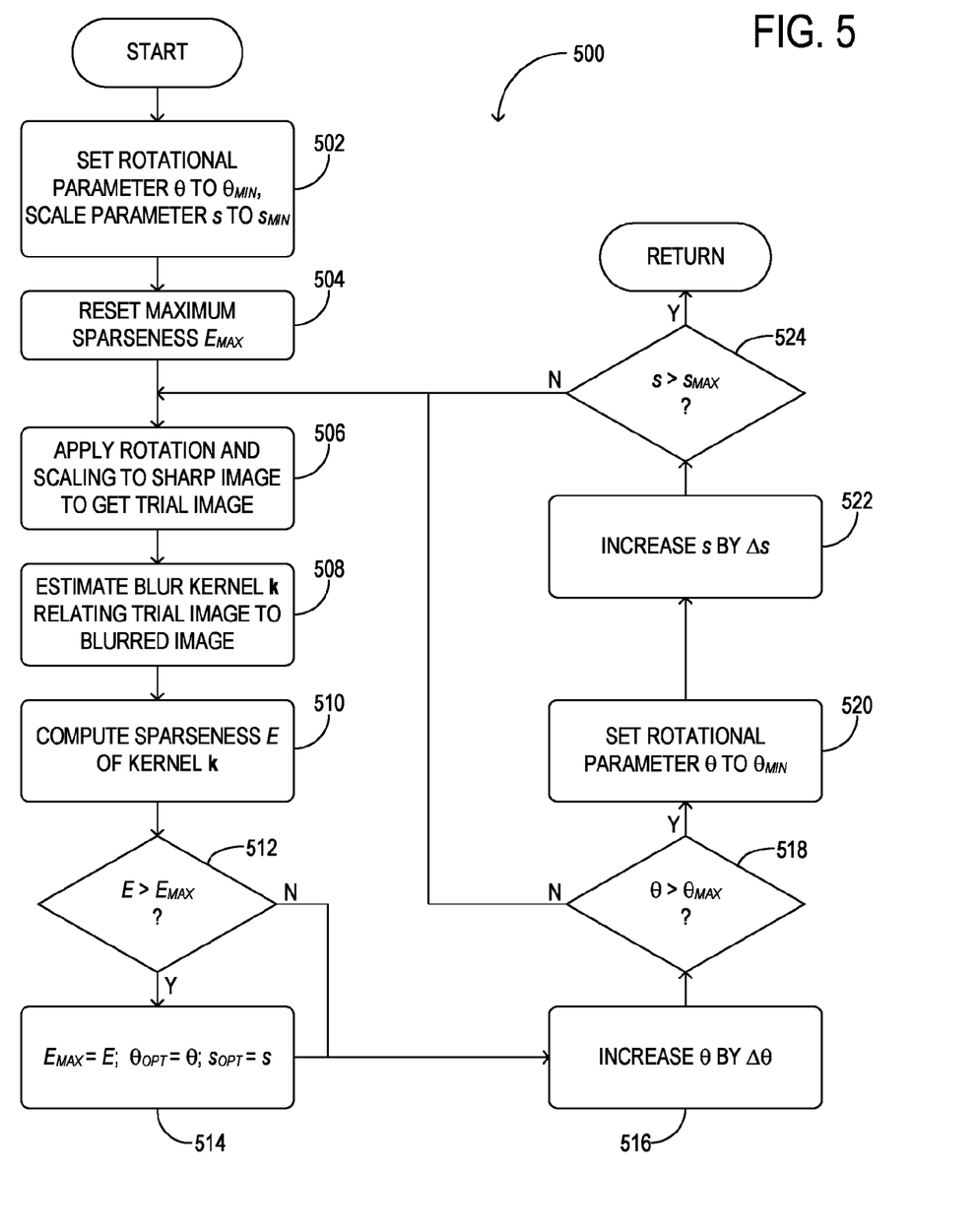
FIG. 5 illustrates aspects of a method to align two images of a subject, in accordance with an embodiment of the present disclosure.

FIG. 5 illustrates method 500, which includes some operational details of method 300, step 302 in one, non-limiting embodiment. At 502, a rotational parameter θ is set to $\theta_{min}$, and a scaling parameter s is set to $s_{min}$. At 504, a maximum sparseness value, $E_{max}$ is reset to an initial value. At 506, a rotational operation and a scaling operation based on s and θ are applied to sharp image I to obtain trial image Î. At 508, a blur kernel k is estimated that relates the trial image Î to blurred image B. At 510, a sparseness E(k) of blur kernel k is computed according to eq 7.

At 512, it is determined whether or not E(k) exceeds $E_{max}$. If E(k) exceeds $E_{max}$, then at 514, $E_{max}$ is set to E(k); an optimal value of the rotational parameter, $\theta_{opt}$, is set to θ; and an optimal value of the scaling parameter, $s_{opt}$, is set to s. Then, at 516, θ is increased by an increment. At 518, it is determined whether or not θ exceeds a maximum rotational value $\theta_{max}$. If $\theta$ does not exceed $\theta_{max}$, then at 520, the value of $\theta$ is reset to its minimum value, and at 522, the value of s is increased by an increment.

At 524, it is determined whether s exceeds a maximum scaling value $s_{max}$. If s does not exceed $s_{max}$, then execution of the method continues at 505. Otherwise, the method returns.

Figure 6:
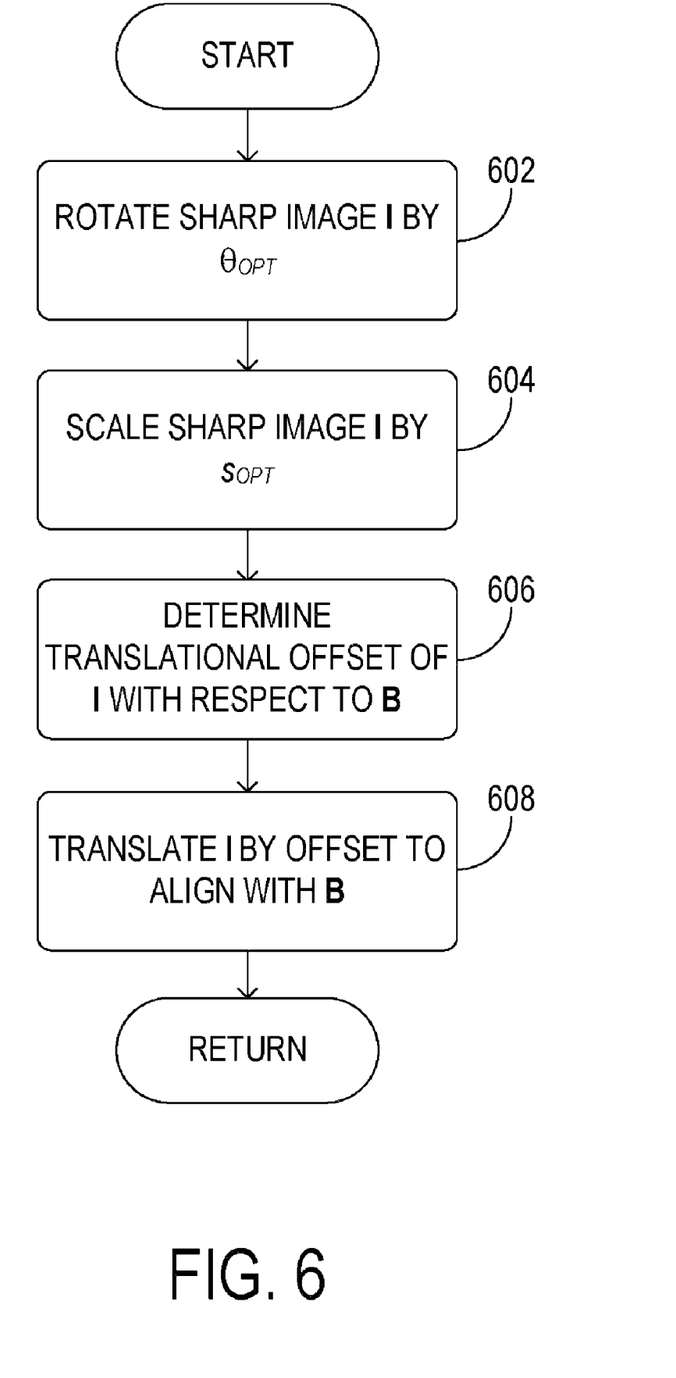
FIG. 6 illustrates aspects of a method to align two images of a subject, in accordance with an embodiment of the present disclosure.

FIG. 6 illustrates method 600, which includes some operational details of method 300, step 304 in one, non-limiting embodiment. At 602, sharp image I is rotated by an amount $\theta_{opt}$. Then, at 604, rotated, sharp image I is scaled by an amount $s_{opt}$. In some examples, $\theta_{opt}$ and $s_{opt}$ may be the optimal values of the rotational and scaling parameters determined in one of the above methods.

At 606, a translational offset of rotated, scaled, sharp image I with respect to blurred image B is determined. In one embodiment, a method based on feature recognition may be used to determine an optimal translational offset $t_{opt}$ by which I is offset with respect to B. Then, at 608, rotated, scaled, sharp image I is translated by $t_{opt}$ to align it with B.

The example control and estimation routines disclosed herein may be used with various system configurations. These routines may represent one or more different processing strategies such as event-driven, interrupt-driven, multi-tasking, multi-threading, and the like. As such, the disclosed process steps (operations, functions, and/or acts) may represent code to be programmed into, or stored on a, device-readable storage medium. The term "device-readable storage medium" includes, but is not limited to, storage media on a computing device, such as volatile or non-volatile memory, disk drives, etc., as well as portable media, such as DVDs, CDs, flash memory drives, portable hard drives, floppy disks, etc.

Figure 7:
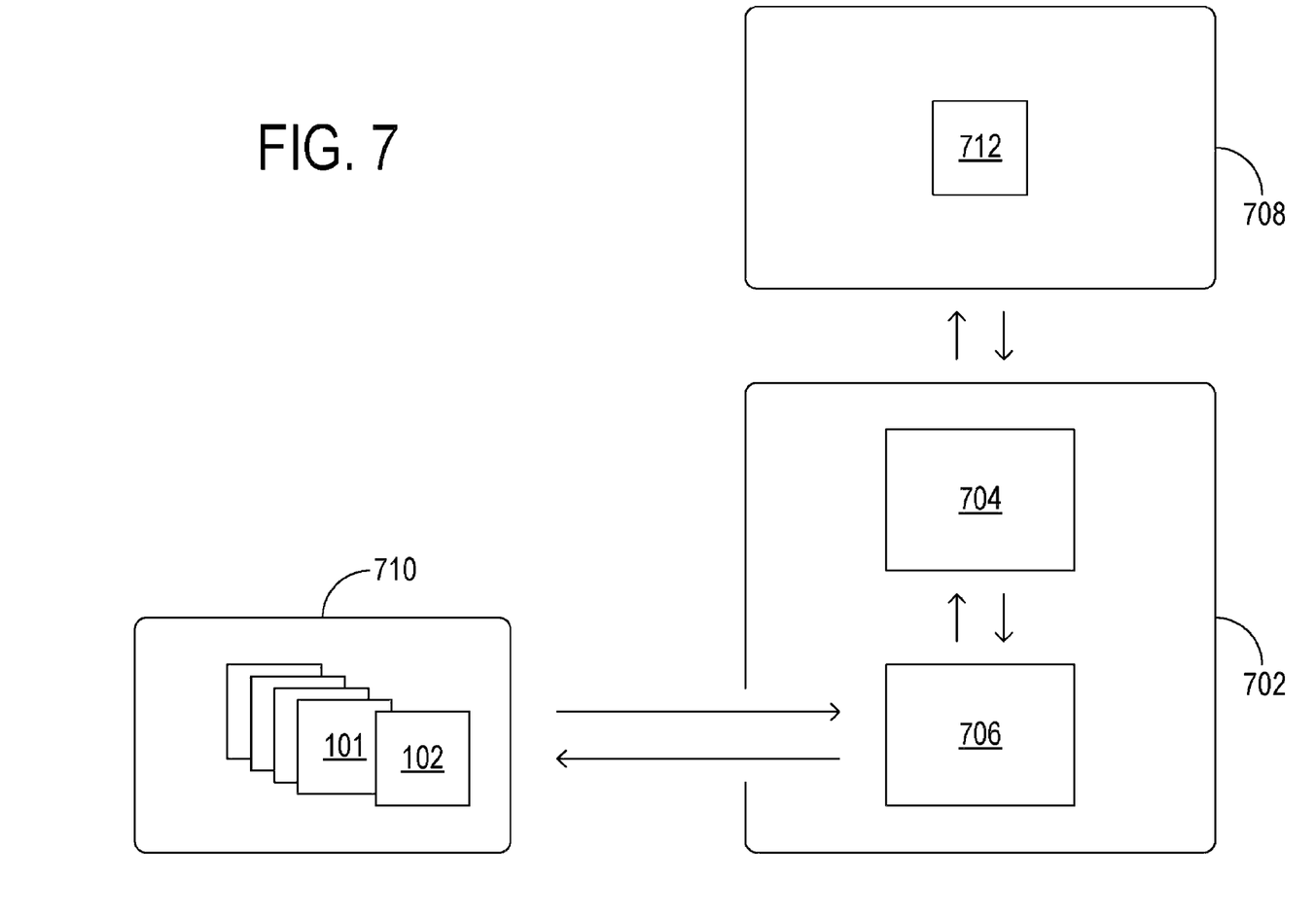
FIG. 7 schematically represents one example embodiment of an environment in which embodiments of the present disclosure may be enacted.

FIG. 7 schematically represents one example embodiment of an environment in which the above process steps may be enacted. First, FIG. 7 shows computing device 702, which includes processor 704 and memory 706. Computing device 702 may be virtually any device having at least a processor and a memory, wherein the processor is operatively coupled to the memory and configured to execute instructions (i.e., code) stored therein. Computing device 702 may be a server system, a desktop or laptop computer, a handheld computer, a cell phone, or a gaming console, for example. Computing device 702 also may be an on-board controller for a digital camera, video camera, or other such digital image capture device.

In FIG. 7, computing device 702 is operatively coupled to image-output device 708, which may include virtually any device configured to display an image. Image-output device 708 may be a printer, a monitor, a touch screen, a television, or a video headset, for example, and may be separate from or incorporated into a body of the computing device 702. Computing device 702 is further coupled to image capture device 710, which may include any device configured to capture a still image or a video image of a subject, and which may be separate from or integrated with a body of the computing device 702. In various embodiments, image capture device 710 may be a digital camera, a scanner, a video camera, or a cell phone, for example. Other embodiments may include a plurality of image-capture devices and/or image-output devices substantially the same or at least partly different from each other.

FIG. 7 shows first image 101 and second image 102 resident on image-capture device 710, and it shows derived image 712 displayed on image-output device. Derived image 712 may be an image derived from aligning first image 101 and second image 102 according to one or more of the methods disclosed herein.

It will be understood that some of the process steps described and/or illustrated herein may in some embodiments be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used.

Finally, it will be understood that the systems and methods described herein are exemplary in nature, and that these specific embodiments or examples are not to be considered in a limiting sense, because numerous variations are contemplated. Accordingly, the present disclosure includes all novel and non-obvious combinations and sub-combinations of the various systems and methods disclosed herein, as well as any and all equivalents thereof.

The invention claimed is:

1. A method to align a first image and a second image of a subject, the method comprising:
for each of a series of blur kernels that vary according to alignment parameters, evaluating blur-kernel sparseness to locate a sparsest blur kernel, the sparsest blur kernel relating a select sharp image to a select blurred image, each of the select sharp image and select blurred image chosen from or computationally derived from the first or second images; and
applying an aligning operation to the first or second image, the aligning operation being dependent on the alignment parameters corresponding to the sparsest blur kernel.

2. The method of claim 1, wherein the aligning operation includes a rotational operation.

3. The method of claim 1, wherein the aligning operation includes a scaling operation.

4. The method of claim 1, wherein one or more of the first image and the second image is a fine image, and one or more of the select sharp image and the select blurred image is computationally derived from the fine image by downsampling.

5. The method of claim 1, further comprising:
applying a series of coordinate transforms based on the alignment parameters to the first image to yield a corresponding series of trial images;
computing a corresponding series of blur kernels relating the series of trial images to the second image; and
identifying within the series of coordinate transforms a select coordinate transform corresponding to the sparsest blur kernel.

6. The method of claim 5, wherein the aligning operation is at least partly based on the select coordinate transform.

7. The method of claim 5, wherein the second image is the select blurred image, wherein applying the select coordinate transform to the first image results in the select sharp image, and wherein and the series of trial images includes the select sharp image.

8. The method of claim 5, wherein the second image is the select sharp image, wherein applying the select coordinate transform to the first image results in the select blurred image, and wherein the series of trial images includes the select blurred image.

9. The method of claim 5, further comprising applying a translational alignment procedure to one or more of the first image and the second image.

10. A method to align a sharp image of a subject and a blurred image of the subject, the method comprising:
computing a series of trial images by applying a corresponding series of coordinate transforms to the sharp image, the series of coordinate transforms differing with respect to one or more of a rotational operation and a scaling operation;

computing a series blur kernels corresponding to the series of trial images, each blur kernel mapping a trial image from the series of trial images to the blurred image;

for each blur kernel in the series of blur kernels, evaluating blur-kernel sparseness to locate a sparsest blur kernel; and identifying one or more of the rotational operation and the scaling operation of the coordinate transform mapping the trial image corresponding to the sparsest blur kernel to the blurred image.

11. The method of claim 10, wherein evaluating blur-kernel sparseness comprises evaluating a sparseness E(k) related to a blur-kernel size Z and to a blur-kernel distribution function $p(k_i)$ according to $$E(k) = -\frac{1}{Z}\sum_i \ln p(k_i), \quad (7)$$

where $k_i$ is an ith element in blur kernel k.

12. The method of claim 10, wherein evaluating blur-kernel sparseness comprises evaluating an entropy S(k) of a blur-kernel distribution function p(x) according to $S(k) = -\int_x p(x) \ln p(x)$.

13. The method of claim 10, further comprising applying the one or more of the rotational operation and the scaling operation to the sharp image.

14. The method of claim 10, further comprising applying, in reverse, the one or more of the rotational operation and the scaling operation to the blurred image.

15. A device-readable storage medium excluding signals per-se, the device-readable storage medium comprising instructions executable by a computing device to:

compute a series of trial images by applying a series of coordinate transforms to an operand image, the series of coordinate transforms differing with respect to one or more of a rotational operation and a scaling operation;

compute a series blur kernels corresponding to the series of trial images, each blur kernel relating a trial image from the series of trial images to a target image;

for each blur kernel in the series of blur kernels, evaluating blur-kernel sparseness to locate a sparsest blur kernel;

identify one or more of the rotational operation and the scaling operation of the coordinate transform relating the trial image corresponding to the sparsest blur kernel to the target image.

16. The storage medium of claim 15, wherein the target image is a blurred image.

17. The storage medium of claim 15, wherein the target image is a sharp image.

18. The storage medium device of claim 15, wherein the series of coordinate transforms spans a two-dimensional parameter space, the two-dimensional parameter space including a rotational parameter and a scaling parameter.

19. The storage medium of claim 15, wherein the series of coordinate transforms spans a four-dimensional parameter space, the four-dimensional parameter space including two rotational parameters and two scaling parameters.

20. The storage medium of claim 19, wherein the coordinate transform is based on an affine transformation.

* * * * *